(12) United States Patent
Brault et al.

(10) Patent No.: US 7,458,773 B2
(45) Date of Patent: Dec. 2, 2008

(54) TURBOMACHINE WITH CONTRAROTATING FANS

(75) Inventors: Michel Brault, Boussy-Saint-Antoine (FR); Jean-Claude Taillant, Vaux-le-Penil (FR)

(73) Assignee: SNECMA, Paris (FR)

(*) Notice: Subject to any disclaimer, the term of this patent is extended or adjusted under 35 U.S.C. 154(b) by 508 days.

(21) Appl. No.: 11/202,336

(22) Filed: Aug. 12, 2005

(65) Prior Publication Data

US 2007/0006569 A1  Jan. 11, 2007

(30) Foreign Application Priority Data

Aug. 12, 2004  (FR)  .................................. 04 08836

(51) Int. Cl.
*F01D 1/26* (2006.01)
*F01D 25/00* (2006.01)

(52) U.S. Cl. ..................... 415/216.1; 60/226.1; 416/129

(58) Field of Classification Search ................. 416/129, 416/200 A; 415/216.1
See application file for complete search history.

(56) References Cited

U.S. PATENT DOCUMENTS

| 4,375,906 A | 3/1983 | Roberts et al. |
| 4,744,214 A * | 5/1988 | Monsarrat et al. ........... 60/226.1 |
| 5,274,999 A * | 1/1994 | Rohra et al. ................ 60/226.1 |
| 2004/0055276 A1* | 3/2004 | John Lewis et al. ......... 60/226.1 |
| 2007/0006569 A1 | 1/2007 | Brault et al. |

FOREIGN PATENT DOCUMENTS

| EP | 0 298 014 A1 | 1/1989 |
| EP | 0 521 379 A1 | 1/1993 |
| EP | 1 403 485 A2 | 3/2004 |

OTHER PUBLICATIONS

European Search Report, FA 654219, dated Mar. 14, 2005.
U.S. Appl. No. 12/052,108, filed Mar. 20, 2008, Brault, et al.

* cited by examiner

*Primary Examiner*—Richard Edgar
(74) *Attorney, Agent, or Firm*—Oblon, Spivak, McClelland, Maier & Neustadt, P.C.

(57) ABSTRACT

A turbomachine comprising: a gas generator for producing combustion gas; a turbine section through which the combustion gas passes and comprising first and second rows of contrarotating turbine rotor blades respectively driving first and second low-pressure shafts in rotation; and a fan section comprising a first row of fan blades mounted on a front fan shaft that is connected to an upstream end of the first low-pressure shaft, and a second row of fan blades axially offset from the first row and mounted on a rear fan shaft that is connected to an upstream end of the second low-pressure shaft, the front fan shaft being connected to the upstream end of the first low-pressure shaft via a removable sleeve for transmitting torque.

14 Claims, 3 Drawing Sheets

TURBOMACHINE WITH CONTRAROTATING FANS

BACKGROUND OF THE INVENTION

The present invention relates to the general field of turbomachines having two contrarotating fans mounted at the front. The invention relates more particularly to a specific arrangement of a turbomachine with contrarotating fans suitable for facilitating the assembling and disassembling of the various bodies making it up.

In conventional turbomachines having a large bypass ratio, the fan section comprises a single row of large-diameter rotor blades. The peripheral speed at the tips of the blades is proportional to said diameter and to the speed of rotation of the fan. In order to obtain good efficiency, this peripheral speed must be below the speed of sound. This can be achieved by interposing stepdown gearing between the shaft for driving the blades and the fan. However such gearing increases the weight of the engine and the turbomachine often presents low efficiency together with high specific fuel consumption.

In order to increase efficiency and reduce specific fuel consumption, it is known to fit the fan section of a turbomachine with two rows of blades (i.e. two fans) that are axially spaced apart from each other, with each being driven directly by a low-pressure shaft without any interposed gearing. In that type of turbomachine, each fan contributes in practically identical manner to propulsion. Thus, U.S. Pat. No. 4,860,537 discloses a turbomachine that uses contrarotating turbine sections (i.e. sections turning in opposite directions) that drive likewise contrarotating fans.

Turbomachines with contrarotating fans known in the prior art present problems of assembling and disassembling the various elements that make them up. In particular, the operations of assembling and disassembling the shaft of the rear fan are made almost impossible by the specific disposition of systems for securing said rear fan shaft on the appropriate low-pressure drive shaft. Furthermore, it is also very difficult to feed cooling and lubricating oil to the bearings that are mounted between the front and rear fan shafts.

OBJECT AND SUMMARY OF THE INVENTION

A main object of the invention is thus to mitigate such drawbacks by providing a turbomachine comprising: a gas generator for producing combustion gas; a turbine section through which the combustion gas passes and comprising first and second rows of contrarotating turbine rotor blades respectively driving first and second low-pressure shafts in rotation; and a fan section comprising a first row of fan blades mounted on a front fan shaft that is connected to an upstream end of the first low-pressure shaft, and a second row of fan blades axially offset from the first row and mounted on a rear fan shaft that is connected to an upstream end of the second low-pressure shaft, wherein the front fan shaft is connected to the upstream end of the first low-pressure shaft via a removable sleeve for transmitting torque.

Fitting a removable sleeve between the front fan shaft and the first low-pressure shaft thus facilitates assembling and disassembling the low-pressure shafts via the rear of the machine. In particular, by disassembling this sleeve alone, it is possible to disassemble the turbines for driving the fan shafts rearwards without having to disassemble the fan shafts themselves.

According to an advantageous characteristic, the removable sleeve and the front fan shaft form an oil feed cavity for lubricating and cooling bearings mounted between the front and rear fan shafts.

The presence of the removable sleeve thus enables oil to be fed properly to the bearings that are mounted between the two fan shafts.

The removable sleeve may be connected to the upstream end of the first low-pressure shaft and to the front fan shaft by fluting systems.

In addition, the removable sleeve may be fastened to the first low-pressure shaft by a nut tightened onto the upstream end of the first low-pressure shaft.

According to another advantageous characteristic, the removable sleeve presents an annular flange at a upstream end, said flange bearing axially against a complementary radial shoulder of the front fan shaft.

Under such circumstances, the annular flange of the removable sleeve and the complementary radial shoulder of the front fan shaft can be held pressed axially against each other by a nut-and-bolt system.

The rear fan shaft may be fastened to the second low-pressure shaft by a nut tightened onto the upstream end of said second low-pressure shaft and accessible once said sleeve has been removed.

BRIEF DESCRIPTION OF THE DRAWINGS

Other characteristics and advantages of the present invention appear from the following description given with reference to the accompanying drawings which show an embodiment having no limiting character. In the figures.

DETAILED DESCRIPTION OF AN EMBODIMENT

Figure 1:
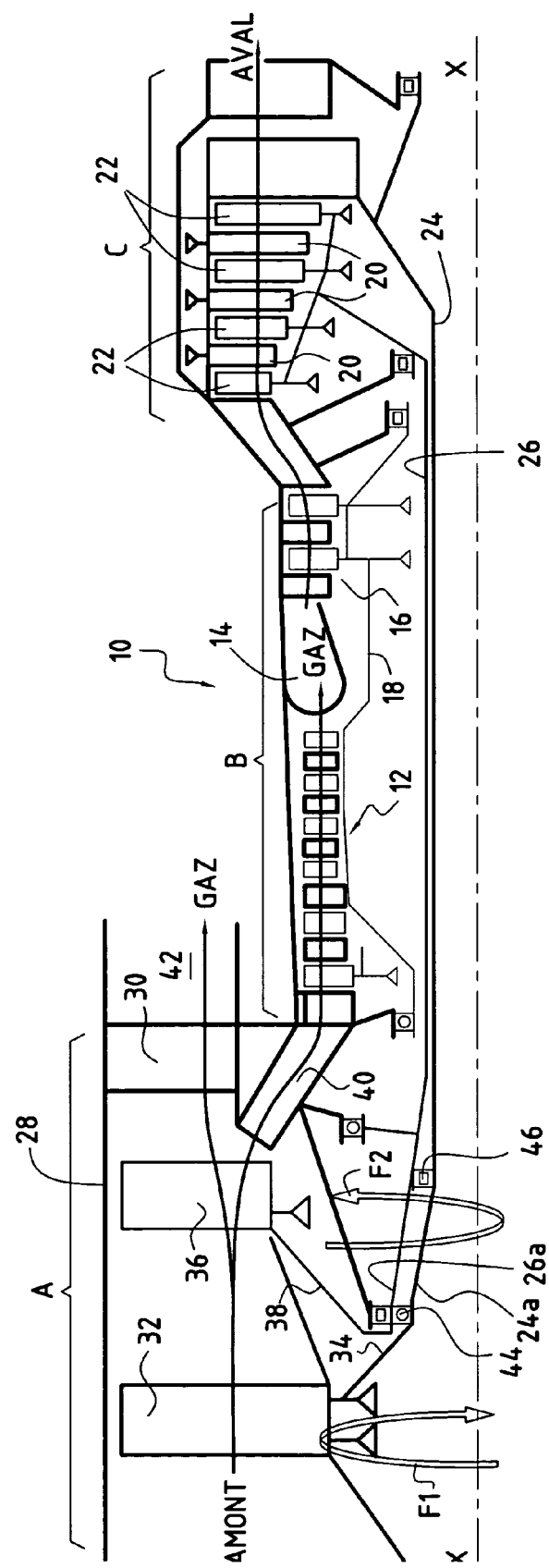
FIG. 1 is a general view illustrating the operating principle of a turbomachine having contrarotating fans.

With reference to FIG. 1, a turbomachine 10 having contrarotating fans presents a longitudinal axis X-X. From the upstream to downstream, the turbomachine 10 essentially comprises three portions: a front module A (or fan section); an intermediate module B (or high-pressure body); and a rear module C (or low-pressure turbine section). The term "upstream" and "downstream" are applied to the elements of the turbomachine relative to the direction in which gas flows therethrough.

The three portions A, B, and C of the turbomachine are modular, i.e. each forms a single assembly, and each can be replaced by being separated from the other portions of the turbomachine.

In well-known manner the high-pressure body B includes a gas generator for producing combustion gas. The gas generator comprises a compressor 12, a combustion chamber 14, and a high-pressure turbine 16.

The air compressed by the compressor 12 is mixed with fuel in the combustion chamber 14 before being burnt therein. The combustion gas as produced in this way drives the rotor blades of the high-pressure turbine 16 which itself drives the compressor 12 via a high-pressure shaft 18. The flow of combustion gas through the turbomachine 10 takes place axially from upstream to downstream.

The low-pressure turbine section C includes a first annular rotor. This first rotor is made up of a plurality of rows of rotary turbine blades 20 extending radially inwards and axially spaced apart from one another.

The low-pressure turbine section C also comprises a second annular rotor. This second rotor comprises a plurality of rows of rotary turbine blades 22 extending radially outwards and axially spaced apart from one another. The turbine blades 20, 22 of the first and second rotors are disposed in alternation relative to one another so that the first and second rotors are interleaved one in the other.

The rotary turbine blades 20 of the first rotor are supported in rotation by a first low-pressure shaft 24. Similarly, the rotary turbine blades 22 of the second rotor are supported in rotation by a second low-pressure shaft 26 disposed coaxially around the first shaft 24. The low-pressure shafts 24 and 26 extend axially from upstream to downstream along the turbomachine.

Combustion gas coming from the high-pressure body B passes through the low-pressure turbine section C. This combustion gas thus drives rotation of the turbine blades 20, 22 of the first and second rotors in opposite directions. Thus, the first and second low-pressure shafts 24 and 26 likewise rotate in opposite directions.

The fan section A is situated at the front of the turbomachine. A cowl 28 surrounds the fan section A in annular manner. The cowl 28 is supported by spacers 30 that extend radially towards the inside of the turbomachine.

The fan section A has a first row of fan blades 32 mounted on a front fan shaft 34 which is connected to an upstream end 24a of the first low-pressure shaft 24. The fan section A also has a second row of fan blades 36 which are offset axially downstream from the first row of fan blades 32 and mounted on a rear flange shaft 38 connected to an upstream end 26a of the second low-pressure shaft 26.

The first and second rows of fan blades 34 and 36 thus turn in opposite directions as represented by way of example by respective arrows F1 and F2. This configuration with contrarotating fans thus confers high efficiency on the turbomachine for low specific fuel consumption.

The fan blades 32, 36 extend radially from the front and rear fan shafts 34 and 38 almost as far as the cowl 28. They are disposed in an air flow passage that feeds both the primary stream 40 leading to the compressor 12 of the high-pressure body B, and the bypass or secondary stream 42.

At its end 24a, the first low-pressure shaft 24 supports the second low-pressure shaft 26 in rotation via a first rolling bearing 44 and a second rolling bearing 46 disposed downstream from the first.

The first rolling bearing 44 is a ball-type bearing capable of withstanding axial loads, while the second rolling bearing 46 is a roller-type bearing for withstanding radial loads on the turbomachine.

Although such a configuration for a turbomachine with contrarotating fans operates in theory, it is difficult to build in practice.

There arises specifically a problem of assembling and disassembling the turbomachine. More particularly, the arrangement of the second low-pressure shaft 26 makes it impossible to assemble. This leads likewise to it being impossible to assemble or disassemble the low-pressure turbine section C properly without needing to take action on the fan section A.

Furthermore, such a configuration does not make it possible to obtain a proper feed of lubricating and cooling oil to the bearings 44 and 46 which support the second low-pressure shaft 26 in rotation.

Figure 2:
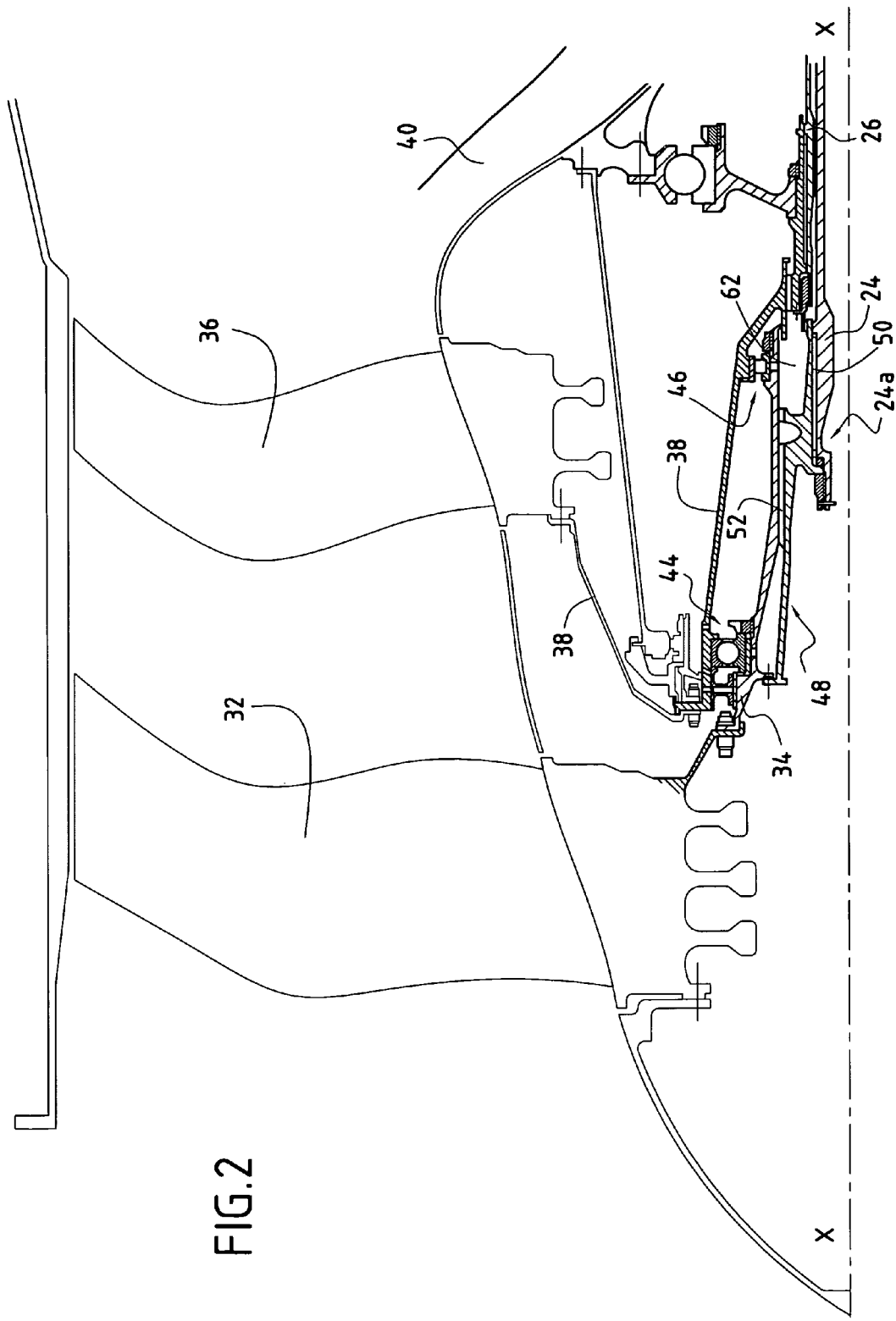
FIG. 2 is a fragmentary longitudinal section view of a turbomachine of the invention.
Figure 3:
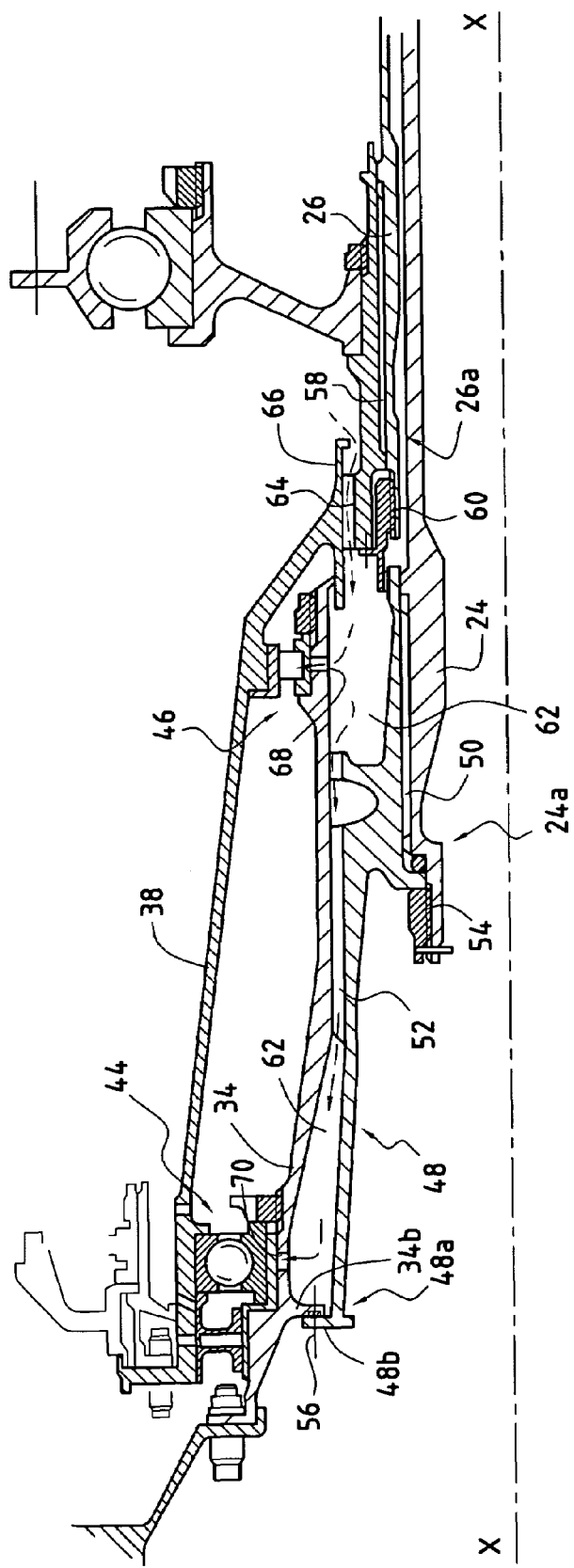
FIG. 3 is an enlarged view of the removable sleeve fitted to the FIG. 2 turbomachine.

According to the invention, the front fan shaft 34 is connected to the upstream end 24a of the first low-pressure shaft 24 via a removable sleeve 48 for transmitting torque and shown in FIGS. 2 and 3.

Such a sleeve is a removable length of tube which is independent of the low-pressure shafts 24 and 26 and of the fan shafts 34 and 38. With reference to FIGS. 2 and 3, the removable sleeve 46 is connected to the front end 24a of the first low-pressure shaft 24 and to the front fan shaft 34 by respective fluting systems 50, 52 for transmitting torque.

More precisely, the removable sleeve 48 is fastened to the first low-pressure shaft 24 by a nut 54 tightened onto the upstream end 24a of said first low-pressure shaft. Such a nut 54 serves to hold the sleeve 48 axially against the low-pressure shaft 24.

Preferably, the removable sleeve 48 also presents an annular flange 48b at an upstream end 48a, which flange bears axially against a complementary radial shoulder 34b of the front fan shaft 34. Under such circumstances, the annular flange 48b of the removable sleeve 48 and the complementary radial shoulder 34b of the front fan shaft 34 are held pressed axially one against the other by a nut-and-bolt system 56.

An O-ring (not shown in the figures) may also be interposed between these two radial elements 48b and 34b in order to ensure that the assembly is properly sealed.

The rear fan shaft 38 is likewise driven in rotation by the second low-pressure shaft 26 via fluting 58. It is also fastened to the second low-pressure shaft 26 by a nut 60 that is tightened on the upstream end 26a of said second low-pressure shaft. This nut 60, which holds the rear fan shaft 38 axially on the second low-pressure shaft 26, is accessible once the sleeve 48 has been removed.

By withdrawing the nut 54 and the nut-and-bolt system 56 that serves to hold the sleeve 48 axially on the front fan shaft 34 and on the first low-pressure shaft 24, the sleeve 48 can easily be removed forwards. The nut 60 for axially holding the rear fan shaft 38 on the second low-pressure shaft 26 is then accessible and can likewise be disassembled easily.

As a result, the entire low-pressure turbine section C (i.e. comprising in particular the first and second low-pressure shafts 24 and 26) can be disassembled (or assembled) from the rear without any need to begin by disassembling (or assembling) the fan section A. This makes the turbomachine much simpler to assemble and disassemble.

According to an advantageous characteristic, the removable sleeve 48 and the front fan shaft 34 together form an annular oil-feed cavity 62 for lubricating and cooling the first and second rolling bearings 44 and 46 which are mounted between the front and rear fan shafts 34 and 38. In other words, the cavity 62 is defined radially between the removable sleeve 48 and the front fan shaft 34.

The cavity 62 is fed with oil via a plurality of orifices 64 formed through the rear fan shaft 38 level with the nut 60 for holding said rear fan shaft axially. The oil is projected by means of a nozzle (not shown), and a scoop 66 serves to direct the oil into the orifices 64.

Under the effect of centrifugal force, the oil present in the oil feed cavity 62 then travels along holes 68 formed through the front fan shaft 34 and opening into the oil feed cavity level with the races of the second bearing 46.

Furthermore, the oil present in the oil feed cavity 62 propagates upstream by gravity, e.g. by flowing along the fluting 52 between the removable sleeve 48 and the front fan shaft 34. Alternatively, the oil can propagate upstream by passing through orifices made for this purpose through the removable sleeve 48 (not shown in the figures).

Under the effect of centrifugal force, the oil present upstream then passes through holes 70 formed in the front fan shaft 34 opening out into the oil feed cavity 62 level with the races of the first bearing 44.

As a result, it is possible to feed lubricating and cooling oil properly to the first and second bearings 44 and 46 which are mounted between the front and rear fan shafts 34 and 38.

It should be observed that an O-ring (not shown) that can be interposed between the annular flange 48b on the removable sleeve 48 and the complementary radial shoulder 34b of the front fan shaft 34 can serve to provide good sealing of the oil feed cavity 62.

It should be observed that the present invention is not limited to the particular shape of removable sleeve 48 as shown in FIGS. 2 and 3, but covers any possible variants of the removable sleeve that facilitates assembling and disassembling the turbine section of a turbomachine having contrarotating fans.

What is claimed is:

1. A turbomachine comprising:
   a gas generator for producing combustion gas;
   a turbine section through which the combustion gas passes and comprising first and second rows of contrarotating turbine rotor blades respectively driving first and second low-pressure shafts in rotation;
   a fan section comprising a first row of fan blades mounted on a front fan shaft that is connected to an upstream end of the first low-pressure shaft, and a second row of fan blades axially offset from the first row and mounted on a rear fan shaft that is connected to an upstream end of the second low-pressure shaft; and
   a torque transmitting removable sleeve connecting the front fan shaft to the upstream end of the first low-pressure shaft,
   wherein said torque transmitting removable sleeve is removable in order to disassemble the first and second low-pressure shafts from the rear without having to first disassemble the fan section.

2. A turbomachine according to claim 1, wherein the removable sleeve and the front fan shaft form an oil feed cavity for lubricating and cooling bearings mounted between the front and rear fan shafts.

3. A turbomachine according to claim 1, wherein the removable sleeve is connected to the upstream end of the first low-pressure shaft and to the front fan shaft by fluting systems.

4. A turbomachine according to claim 3, wherein the removable sleeve is fastened to the first low-pressure shaft by a nut tightened on the upstream end of said first low-pressure shaft.

5. A turbomachine according to claim 4, wherein the removable sleeve presents, at an upstream end, an annular flange bearing axially against a complementary radial shoulder of the front fan shaft.

6. A turbomachine according to claim 5, wherein the rear fan shaft is fixed on the second low-pressure shaft by a nut tightened on the upstream end of said second low-pressure shaft and accessible when said sleeve is removed.

7. A turbomachine according to claim 6, wherein the annular flange of the removable sleeve and the complementary radial shoulder of the front fan shaft are held pressed axially against each other by a nut-and-bolt system.

8. A turbomachine according to claim 6, wherein the removable sleeve and the front fan shaft form an oil feed cavity for lubricating and cooling bearings mounted between the front and rear fan shafts.

9. A turbomachine according to claim 1, wherein the removable sleeve is fastened to the first low-pressure shaft by a nut tightened on the upstream end of said first low-pressure shaft.

10. A turbomachine according to claim 1, wherein the removable sleeve presents, at an upstream end, an annular flange bearing axially against a complementary radial shoulder of the front fan shaft.

11. A turbomachine according to claim 10, wherein the annular flange of the removable sleeve and the complementary radial shoulder of the front fan shaft are held pressed axially against each other by a nut-and-bolt system.

12. A turbomachine according to claim 1, wherein the rear fan shaft is fixed on the second low-pressure shaft by a nut tightened on the upstream end of said second low-pressure shaft and accessible when said sleeve is removed.

13. A turbomachine according to claim 1, wherein said second low-pressure shaft is disposed coaxially around said first low-pressure shaft.

14. A turbomachine according to claim 13, wherein the removable sleeve is fixed axially on the upstream end of said first low-pressure shaft, and the rear fan shaft is fixed axially on the upstream end of said second low-pressure shaft.

* * * * *